(12) United States Patent
Kim

(10) Patent No.: US 12,522,289 B2
(45) Date of Patent: Jan. 13, 2026

(54) SYSTEM AND METHOD FOR CONTROLLING FOUR-WHEEL INDEPENDENT STEERING VEHICLES

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 107 days.

(21) Appl. No.: 18/527,529

(22) Filed: Dec. 4, 2023

(65) Prior Publication Data

US 2025/0002082 A1    Jan. 2, 2025

(30) Foreign Application Priority Data

Jun. 28, 2023    (KR) .................. 10-2023-0083541

(51) Int. Cl.
   *B62D 7/15*    (2006.01)

(52) U.S. Cl.
   CPC .................. *B62D 7/159* (2013.01)

(58) Field of Classification Search
   CPC .................. B62D 7/1509; B62D 7/06
   See application file for complete search history.

(56) References Cited

U.S. PATENT DOCUMENTS

| | | | | |
|---|---|---|---|---|
| 6,029,431 A * | 2/2000 | Dowler | ............... | A01B 51/023 |
| | | | | 180/234 |
| 11,993,262 B2 * | 5/2024 | Collins | ............... | B62D 7/1581 |
| 2002/0153188 A1 * | 10/2002 | Brandt | ............... | E02F 9/2004 |
| | | | | 180/234 |
| 2004/0129491 A1 * | 7/2004 | Bean | ............... | B60B 35/003 |
| | | | | 180/21 |
| 2005/0217906 A1 * | 10/2005 | Spark | ............... | B62D 9/00 |
| | | | | 180/22 |
| 2011/0106382 A1 * | 5/2011 | Kageyama | ............... | B62D 6/04 |
| | | | | 701/42 |
| 2014/0305715 A1 * | 10/2014 | Makino | ............... | B60K 17/358 |
| | | | | 180/6.24 |
| 2015/0134202 A1 * | 5/2015 | Dawson | ............... | B60K 17/356 |
| | | | | 701/41 |
| 2017/0361868 A1 * | 12/2017 | Guy | ............... | B62D 15/025 |

(Continued)

FOREIGN PATENT DOCUMENTS

KR    10-2022-0055947 A    5/2022

*Primary Examiner* — Long T Tran
(74) *Attorney, Agent, or Firm* — Novo TechIP International PLLC

(57) ABSTRACT

Disclosed herein are a system and method for controlling four-wheel independent steering vehicles. The system includes a steering angle sensor configured to detect a steering angle in relation to movement of a steering wheel, a motor controller configured to change a position of a wheel in response to the steering angle, a parallel movement key configured to set a parallel movement mode, and a processor configured to primarily adjust the position of the wheel through the motor controller by setting the parallel movement mode in response to the input of the parallel movement key and to control the motor controller to secondarily adjust the position of the wheel in response to the steering angle by limiting the steering angle of the steering wheel to a range of a limit angle. Therefore, it is possible to prevent the steering angle from changing significantly.

10 Claims, 5 Drawing Sheets

(56) References Cited

U.S. PATENT DOCUMENTS

| | | | |
|---|---|---|---|
| 2021/0061283 A1* | 3/2021 | Hudson | B62D 7/026 |
| 2021/0380165 A1* | 12/2021 | Chao | B62D 7/1509 |
| 2021/0402875 A1* | 12/2021 | Pham | B62D 7/14 |
| 2022/0097704 A1* | 3/2022 | Collins | B60K 1/02 |
| 2023/0159098 A1* | 5/2023 | Hwang | B62D 9/002 |
| | | | 701/41 |
| 2023/0278627 A1* | 9/2023 | Hall | B62D 7/1509 |
| | | | 180/6.28 |
| 2024/0043073 A1* | 2/2024 | Prashant Rao | B60L 15/2036 |

* cited by examiner

SYSTEM AND METHOD FOR CONTROLLING FOUR-WHEEL INDEPENDENT STEERING VEHICLES

CROSS-REFERENCE TO RELATED APPLICATIONS

This application claims priority from and the benefit of Korean Patent Application No. 10-2023-0083541, filed on Jun. 28, 2023, which is hereby incorporated by reference for all purposes as if set forth herein.

TECHNICAL FIELD

Exemplary embodiments of the present disclosure relate to a system and method for controlling four-wheel independent steering vehicles, which control a steering angle for parallel movement in a four-wheel independent steering vehicle with four wheels operating independently.

BACKGROUND

In general, a vehicle is operable with front-wheel control, rear-wheel control, or four-wheel control. This is determined by the positions of wheels to which a drive shaft is connected.

The vehicle may drive forward or backward or turn left or right within a certain angle when the angle of the front wheels thereof is determined by operating a steering wheel.

In recent years, a variety of vehicles have been proposed, such as a four-wheel independent steering vehicle with four wheels operating independently.

A four-wheel independent steering vehicle is configured such that its four wheels are controllable differently. The four-wheel independent steering vehicle not only controls the wheels individually, but also sets the rotation angle range of each wheel to be larger than that of typical vehicles.

Accordingly, it is also possible to move the four-wheel independent steering vehicle in parallel by rotating the wheels 90 degrees. In this case, the vehicle may be easily parked parallel or moved parallel to the next lane by rotating the front and rear wheels 90 degrees.

In addition, the four-wheel independent steering vehicle may rotate in place by adjusting the angles of the four wheels individually. A typical vehicle require more than a certain amount of space to make a U-turn, whereas the four-wheel independent steering vehicle is able to turn easily since it is rotatable in place.

However, in the case of the four-wheel independent steering vehicle, although the four wheels are controllable independently, there is a limit to adjusting the four wheels through driver's steering operation.

Accordingly, there is a trend to set a mode so as to collectively adjust directions of wheels for each situation.

However, if the positions of the wheels are not aligned even when the angle of each wheel is adjusted for parallel movement, an error occurs due to the distortion of the wheel angle. Hence, it is impossible to accomplish accurate parallel movement and the vehicle may move with its wheels turned at a certain angle. As such, even if the mode is set to collectively adjust the wheels, an error occurs depending on the alignment of the wheels. Therefore, there is a need for driver's additional steering.

The related art of the present disclosure is disclosed in Korean Patent Application Publication No. 10-2022-0055947 entitled "METHOD AND SYSTEM FOR CONTROLLING IN-PLACE ROTATION OF FOUR-WHEEL INDEPENDENT STEERING VEHICLE".

SUMMARY

Various embodiments are directed to a system and method for controlling four-wheel independent steering vehicles, which control positions of wheels in a set mode and assist movement of the wheels during additional steering through steering operation in a four-wheel independent steering vehicle.

In an embodiment, there is provided a system for controlling four-wheel independent steering vehicles, which includes a steering angle sensor configured to detect a steering angle in relation to movement of a steering wheel, a motor controller configured to changes a position of a wheel in response to the steering angle, a parallel movement key configured to set a parallel movement mode, and a processor configured to primarily adjust the position of the wheel through the motor controller by setting the parallel movement mode in response to the input of the parallel movement key and to control the motor controller to secondarily adjust the position of the wheel in response to the steering angle by limiting the steering angle of the steering wheel to a range of a limit angle.

When the parallel movement key is input, the processor may check a vehicle speed and whether a brake pedal is operated, and when a signal from the parallel movement key is input, the vehicle speed is 0, and the brake pedal is pressed, the processor may set the parallel movement mode.

The processor may control the wheel to move at a specified angle in the set parallel movement mode, and then set the steering angle detected by the steering angle sensor as a reference steering angle.

The processor may return the position of the wheel to a position corresponding to the reference steering angle when the steering angle caused by steering the steering wheel exceeds the limit angle.

The system for controlling four-wheel independent steering vehicles may further include a position controller configured to apply a control signal to the motor controller, wherein the processor may control a gain of the position controller so that a force to return to a previous position increases as the steering angle approaches the limit angle.

In another embodiment, there is provided a method for controlling four-wheel independent steering vehicles, which includes setting a parallel movement mode by a processor when a parallel movement key is input, primarily adjusting, by the processor, a position of a wheel to a position corresponding to the parallel movement mode through a motor controller, setting a limit angle for a steering angle of a steering wheel and controlling the steering angle to prevent it from exceeding the limit angle by the processor, and secondarily adjusting, by the motor controller, the position of the wheel in response to the steering angle.

The setting a parallel movement mode may include checking a vehicle speed and checking whether a brake pedal is operated when the parallel movement key is input, and setting the parallel movement mode when a signal from the parallel movement key is input, the vehicle speed is 0, and the brake pedal is pressed.

In the controlling the steering angle to prevent it from exceeding the limit angle, the processor may control a gain of a position controller configured to apply a control signal to the motor controller so that a force to return to a previous position increases as the steering angle approaches the limit angle.

The method for controlling four-wheel independent steering vehicles may further include setting a steering angle detected by a steering angle sensor as a reference steering angle, after primarily adjusting, by the processor, a position of a wheel.

In the controlling the steering angle to prevent it from exceeding the limit angle, the processor may return the position of the wheel to a position corresponding to the reference steering angle when the steering angle exceeds the limit angle.

As apparent from the above description, the system and method for controlling four-wheel independent steering vehicles according to the present disclosure can limit steering to be performed within a set range in controlling the position of each wheel depending on the mode to prevent the wheels from moving excessively and can control a driving direction quickly and accurately.

The system and method for controlling four-wheel independent steering vehicles according to the present disclosure can finely adjust the position of each wheel to move the vehicle at an accurate angle.

DETAILED DESCRIPTION

Figure 1:
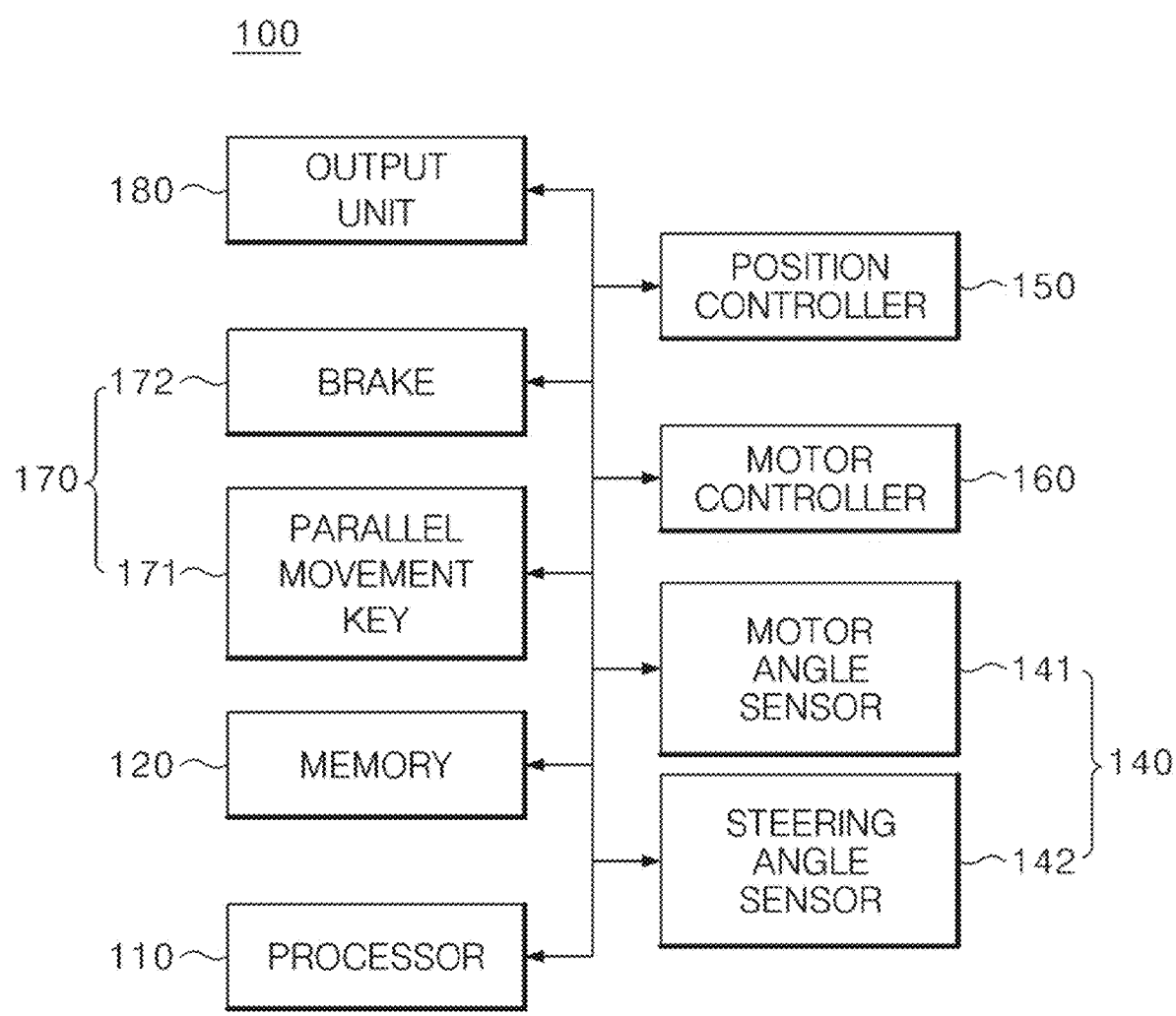
FIG. 1 is a block diagram briefly illustrating a configuration of a system for controlling four-wheel independent steering vehicles according to an embodiment of the present disclosure.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

FIG. 1 is a block diagram briefly illustrating a configuration of a system for controlling four-wheel independent steering vehicles according to an embodiment of the present disclosure.

As illustrated in FIG. 1, the system for controlling four-wheel independent steering vehicles 100, according to the present disclosure, may include a memory 120, a sensor 140, an input unit 170, an output unit 180, a position controller 150, a motor controller 160, and a processor 110.

In addition, the system 100 may further include a steering motor (not shown) and a communication unit (not shown). The communication unit may include a plurality of communication modules to perform in-vehicle communication through CAN communication, and may communicate with external terminals or servers through a wired communication module or wireless communication module.

The sensor 140 may include a motor angle sensor 141 and a steering angle sensor 142. In addition, the sensor 140 may further include a vehicle speed sensor, a column sensor, etc.

The motor angle sensor 141 measures a motor angle in relation to the driving of the steering motor (not shown) of a motor-driven power steering (MDPS) system (not shown). The motor angle sensor 141 detects a rotational position of the steering motor and outputs the motor angle. The processor 110 may estimate a steering angle based on the detected motor angle.

The steering angle sensor 142 is provided on a steering wheel 11 (FIG. 2) to detect the steering angle in relation to the rotation of the steering wheel 11.

The memory 120 may store data in relation to a vehicle mode, data for steering assistance, and a set value in relation to a steering angle limit.

In addition, the memory 120 stores data measured by the sensor 140, data transmitted and received through the communication unit, and data generated during the operation of the processor 110.

The memory 120 may store data for at least one of a steering control algorithm, a mode change algorithm, a wheel direction adjustment algorithm, and a steering motor control algorithm.

Examples of the memory 120 may include storage means, for example, non-volatile memory such as random access memory (RAM), ROM, and electrically erased programmable ROM (EEPROM), and flash memory.

The input unit 170 may include at least one input means of a switch, a button, and a touch pad. Examples of the input unit may include a driving mode switch, a parallel movement key 171, an audio switch, a navigation switch, a steering wheel switch, a brake pedal 172, an accelerator pedal, a gear rod, and a parking brake system button.

The parallel movement key 171 sets a parallel movement mode (Crab mode) in which a vehicle moves in parallel in either a left or right direction by arranging four wheels to form a 90-degree angle with respect to the front of the vehicle.

The brake pedal 172 changes and applies a signal depending on the degree to which it is pressed by a driver. Accordingly, the vehicle may decelerate or stop by operating a braking device in response to the signal from the brake pedal 172.

The output unit 180 may include at least one of an LED lamp, a display, and a speaker. The output unit 180 may output data about a vehicle status and a set mode through the display. The output unit 180 may output at least one of a sound effect, a warning sound, and voice guidance through the speaker. The output unit 180 may output light by changing the color of the LED lamp or the blinking cycle thereof.

The output unit 180 may output a warning or notification corresponding to the error in the event of failure or abnormality by the control command of the processor 110.

The position controller 150 controls the motor controller 160 by generating a target current in relation to a command steering angle based on closed loop control in an autonomous driving mode and a driver steering mode. The position controller 150 may be a PID controller or a state feedback controller.

In addition, the position controller 150 calculates a target current (position controller current command) through position control in the autonomous driving mode, and calculates a target current (driver steering current command) through torque control in the driver steering mode.

The motor controller 160 controls the angle and torque of the steering motor based on the target current from the position controller 150. The steering motor operates under the control of the motor controller 160 to change the directions of the wheels of the vehicle. In this case, the motor controller 160 may be provided in the steering motor.

Accordingly, the MDPS system controls the driving of the steering motor in relation to the steering angle, thereby moving the drive shaft connected to the wheels to change the directions of the wheels.

A four-wheel independent steering vehicle may control four wheels individually.

However, since it is difficult for the driver to control the four wheels individually while driving, the directions of the four wheels may be automatically changed to a set angle depending on a set mode. The motor controller 160 drives the steering motor to change each wheel to a specified angle depending on the mode.

For example, the input of the parallel movement key 171 sets the parallel movement mode to change the directions of the four wheels to the specified angle.

When the parallel movement mode is set, the motor controller 160 controls the wheels to be arranged at a 90-degree angle with respect to the front center of the vehicle.

The motor controller 160 may change the directions of the wheels by controlling the steering motor in response to the signal from the position controller (not shown) of the MDPS system.

Each of the processor 110, the position controller 150, and the motor controller 160 may include at least one microprocessor and may operate based on the algorithm stored in the memory 120.

When a specific mode is set in response to the key input from the input unit 170, the processor 110 controls the motor controller 160 to operate based on the data stored in the memory 120.

When the parallel movement key 171 is input, the processor 110 applies a signal to the motor controller 160 to change the directions of the wheels to an angle of 90 degrees. Meanwhile, in an in-place rotation mode, the four wheels may be set differently for each mode.

The processor 110 may limit parallel movement while driving.

When the parallel movement key 171 is input, the processor 110 checks whether the brake pedal is pressed and determines whether the vehicle is stopped based on the vehicle speed.

When the signal from the parallel movement key 171 is input, the speed of the vehicle is 0, and the brake pedal is pressed, the processor 110 sets the parallel movement mode to adjust the positions of the wheels. If any condition is not satisfied, the processor 110 maintains the existing state without changing to the set mode.

The processor 110 sets the parallel movement mode and controls the position controller 150 and the motor controller 160 to form an angle of 90 degrees by the four wheels with respect to the front center.

In addition, when the wheels are adjusted in the parallel movement mode, the processor 110 stores the reference steering angle measured by the steering angle sensor 142 in the memory 120.

The processor 110 may limit steering by setting a limit angle that limits the operation of the steering wheel 11.

Since an error may occur within a predetermined angle depending on the initial position of each wheel even if the direction of the wheel is adjusted in the parallel movement mode, the processor 110 may control the wheel by steering the steering wheel 11.

In this case, the wheels have already been placed close to the position for parallel movement by the parallel movement key 171. Therefore, the processor 110 may limit the steering of the steering wheel 11 to prevent the wheels from moving excessively due to the steering of the steering wheel 11 by the driver.

The processor 110 may set the steering angle of the steering wheel 11 to return to the reference steering angle when the steering angle deviates from the limit angle (a angle) with respect to the reference steering angle.

The processor 110 may output guidance on steering limitations through the output unit 180, reset the position of each wheel to a position corresponding to the reference steering angle, and then adjust the steering wheel 11 again.

Accordingly, the driver may adjust the position of the wheel by steering the steering wheel 11 within the range of the specified limit angle at the specified steering limitations.

Figure 2:
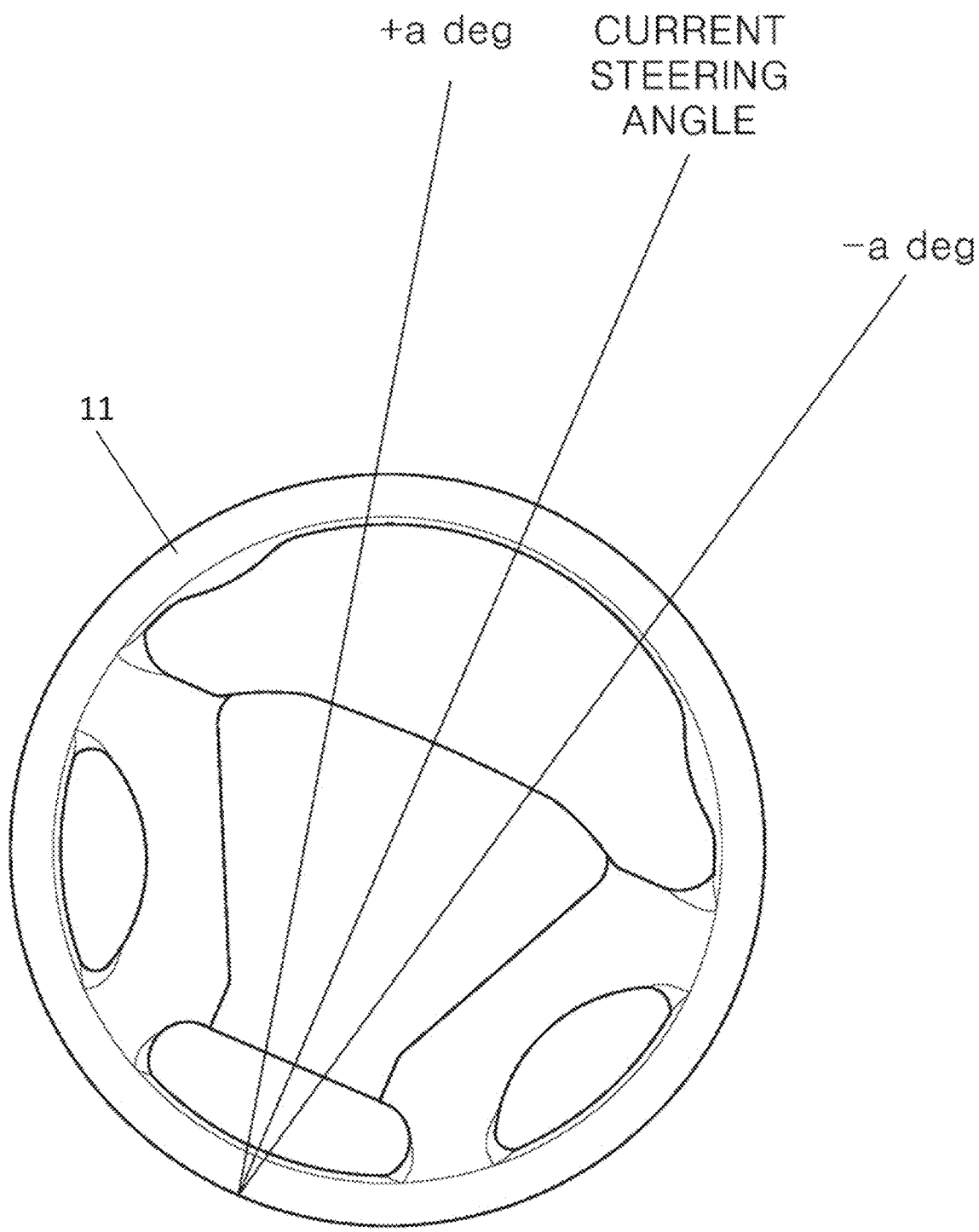
FIG. 2 is a view illustrating a steering angle limit range in the system for controlling four-wheel independent steering vehicles according to the embodiment of the present disclosure.

FIG. 2 is a view illustrating a steering angle limit range in the system for controlling four-wheel independent steering vehicles according to the embodiment of the present disclosure.

As illustrated in FIG. 2, the processor 110 may limit the steering of the steering wheel 11 depending on the set mode.

For example, the processor 110 may store the reference steering angle in the memory 120, and may limit the steering of the steering wheel 11 within the range of ±limit angle (±a angle) with respect to the reference steering angle in the parallel movement mode.

In a typical steering mode, the steering of the steering wheel 11 is limited within the range of about 400 or 500 degrees. However, in the parallel movement mode (Crab mode), the steering of the steering wheel 11 is desirably performed within the range of about 5 degrees.

In other words, since the steering is primarily controlled and then performed again in the parallel movement mode, the limit angle may be set in a narrow angle range.

For example, in the case where the wheels should be arranged to move at 90 degrees with respect to the front center after the parallel movement mode is set, if the wheels are actually arranged at an angle of 88 or 93 degrees, they may be adjusted through the manual steering of the steering wheel 11 by the driver.

The processor 110 sets a limit angle for the steering of the steering wheel 11 so as not to perform the steering at an angle of 15 or 20 degrees when the steering angle adjustment of 2 to 3 degrees is required.

The processor 110 may prevent the driver from excessively change the steering angle by setting the limit angle for the steering of the steering wheel 11 to a steering angle of 5 degrees.

In addition, the processor 110 sets the restoring force of the steering wheel 11 to increase as the limit angle (a angle) is reached, thereby assisting manual steering so that the steering angle is adjustable within the range of 5 degrees.

In addition, the processor 110 may set different steering limitations depending on the type of mode.

In addition to the parallel movement mode, the processor 110 may set steering limitations so that, when the steering must operate at an exact angle, the angle is adjustable within a predetermined range and reaches a target angle.

Figure 3A:
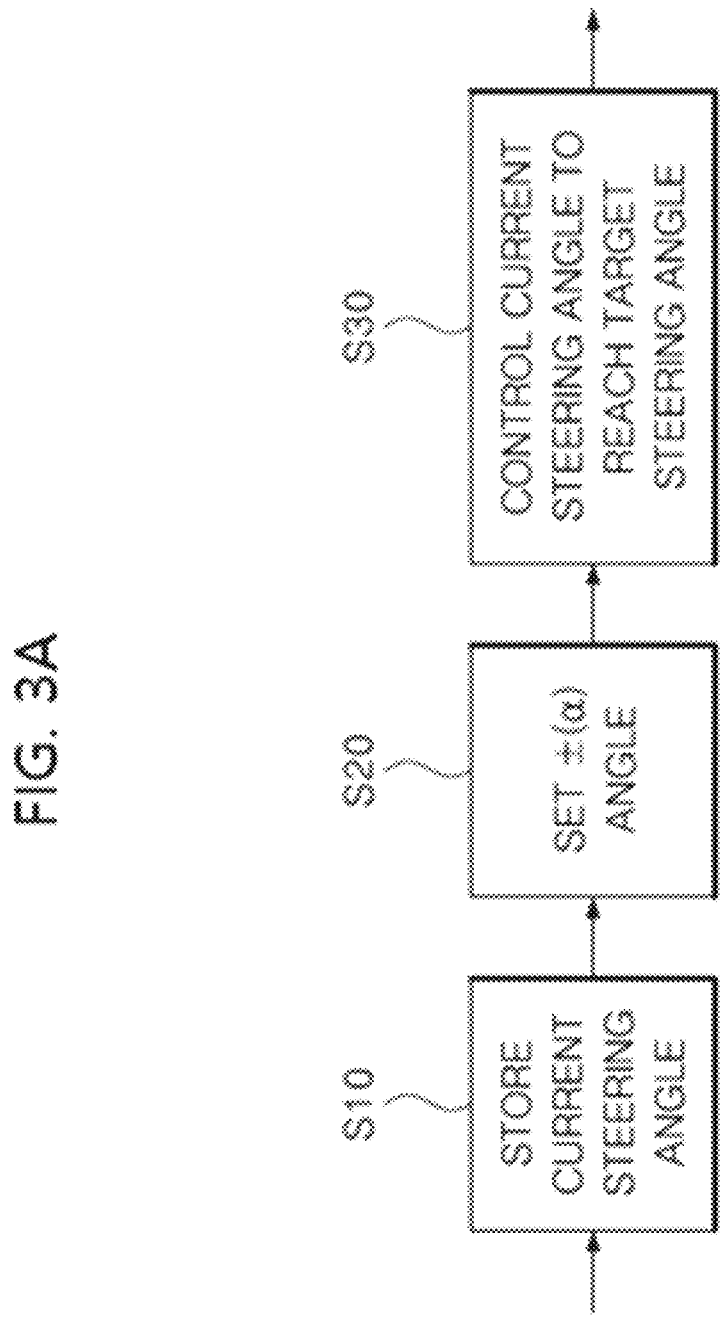
FIGS. 3A and 3B are diagrams illustrating a flow of data in relation to operation control in the system for controlling four-wheel independent steering vehicles according to the embodiment of the present disclosure.
Figure 3B:
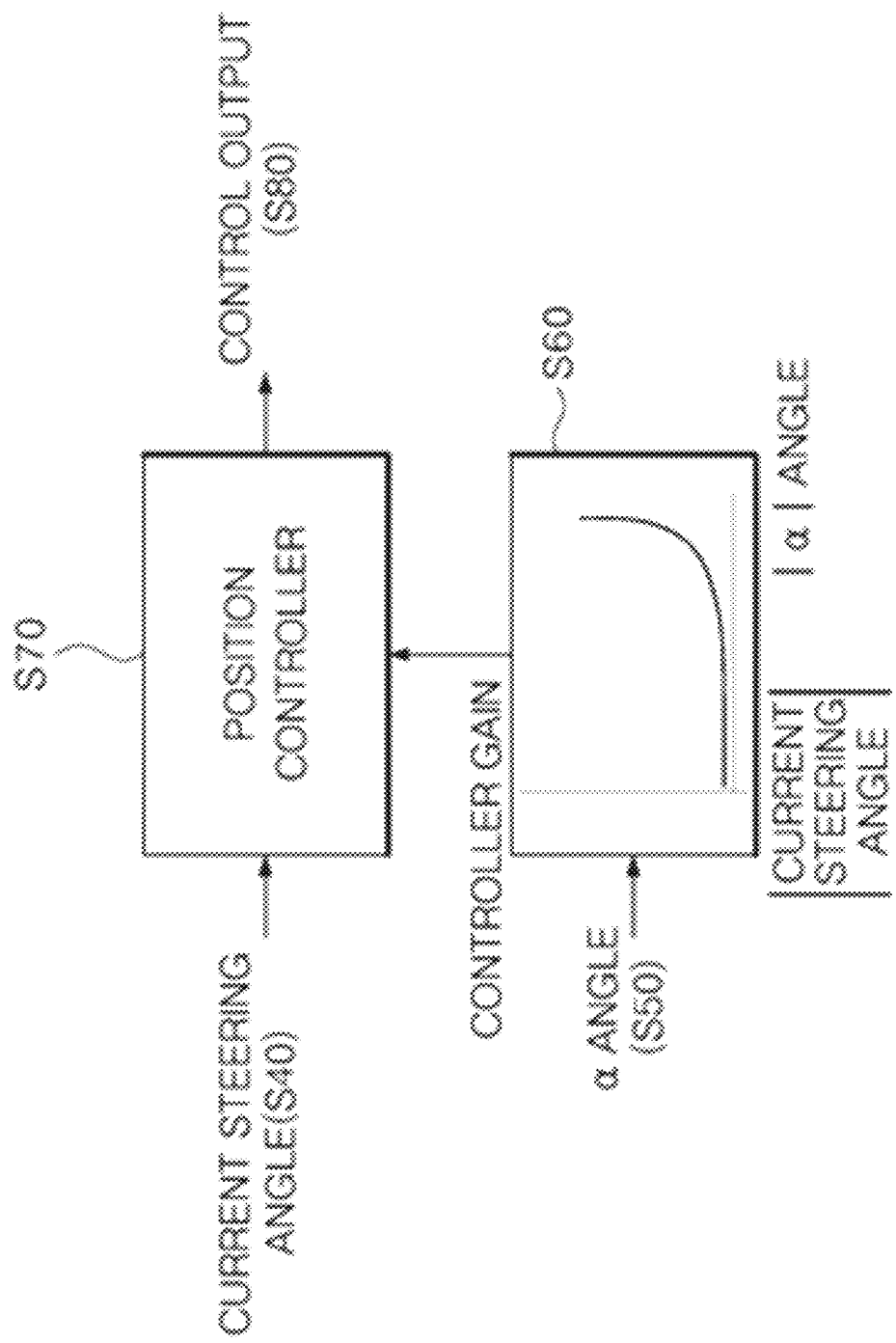

FIGS. 3A and 3B are diagrams illustrating a flow of data in relation to operation control in the system for controlling four-wheel independent steering vehicles according to the embodiment of the present disclosure.

As illustrated in FIG. 3A, the processor 110 stores the reference steering angle measured by the steering angle sensor 142 in the memory 120 (S10).

The processor 110 can set a limit angle (a angle) for steering limitations depending on the mode (S20).

The processor 110 may set different limit angles (a angle) depending on the type of mode. In addition, the processor 110 may set a limit angle based on the data stored in the memory 120.

The processor 110 controls the change in steering angle of the steering wheel 11 so that it does not deviate from the ±limit angle (±a angle) while the steering wheel 11 is operated. The processor 110 controls the steering angle of the steering wheel 11 to be adjusted within the range of the limit angle to reach the target steering angle (S30).

The processor 110 may return the steering angle to the reference steering angle when the steering angle exceeds the limit angle by the steering of the steering wheel 11. Accordingly, each wheel returns to its original position.

As illustrated in FIG. 3B, the processor 110 receives the reference steering angle (S40), and calculates a controller gain for the absolute value of the reference steering angle and the absolute value of the limit angle in relation to auxiliary steering depending on the set limit angle (a angle) (S50) (S60).

The processor 110 may set the reference steering angle as the target steering angle, and increase the controller gain so that the force to return to the reference steering angle increases as the steering angle approaches the limit angle (a angle).

The processor 110 may apply the calculated controller gain to the position controller 150, and may apply control output corresponding to the reference steering angle (S40) (S80).

The position controller 150 may be a PID controller or a state feedback controller.

The position controller 150 may apply the control output to the motor controller 160, and the motor controller 160 may operate to change the positions of the wheels.

As such, the processor 110 may set the controller gain so that the force to return to the reference steering angle increases as the steering angle increases by the steering of the steering wheel 11.

Accordingly, the force to return to the reference steering angle may be greatly applied to the steering operation adjacent to or deviating from the set limit angle, thereby limiting the driver from excessively steering the steering wheel 11. Therefore, the processor 110 may prevent the wheels from turning anymore.

The processor 110 may adjust the steering angle in real time by performing closed loop control to reach an angle for accurately performing parallel movement and maintain that angle.

Figure 4:
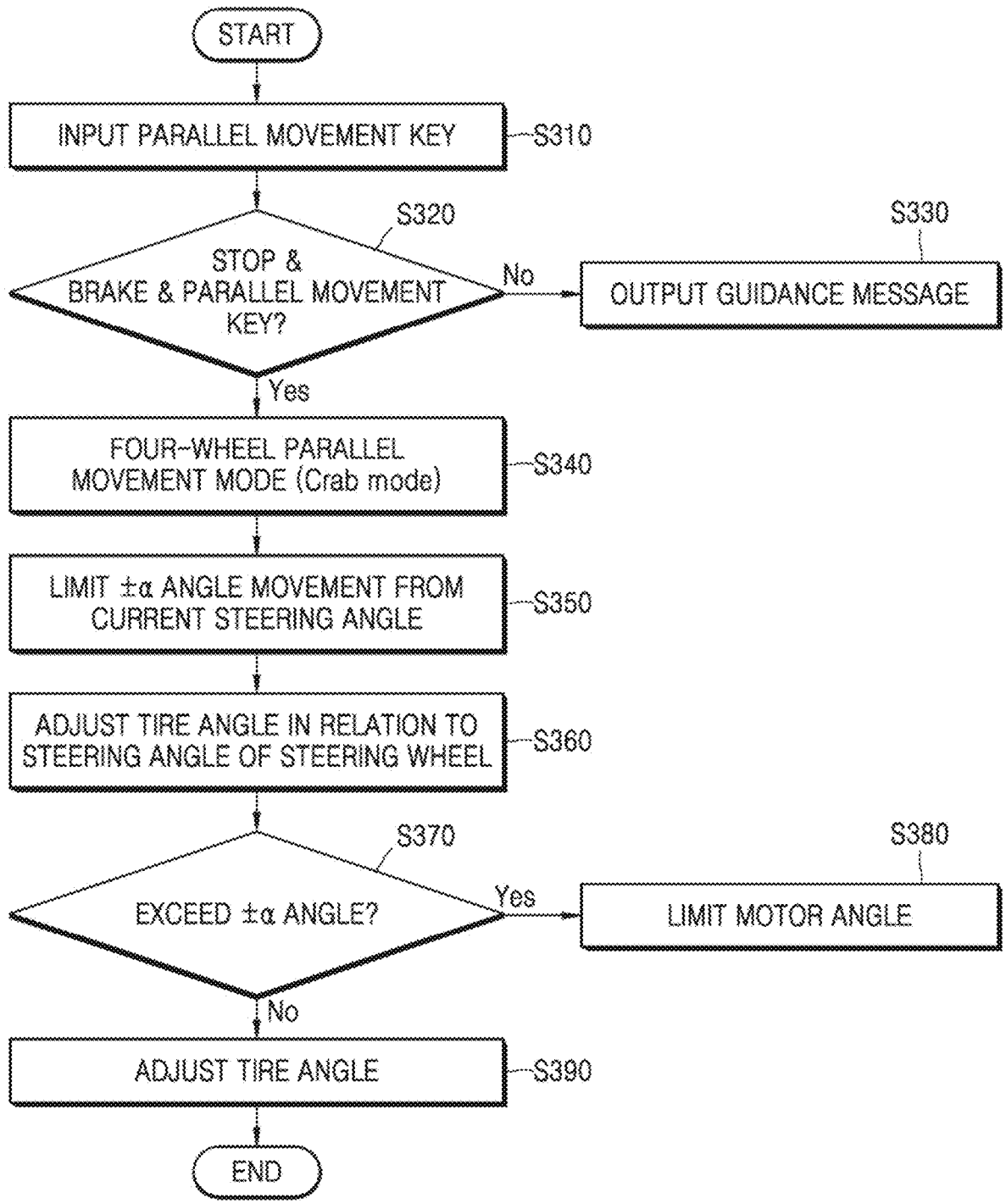
FIG. 4 is a flowchart illustrating a method for controlling four-wheel independent steering vehicles according to another embodiment of the present disclosure.

FIG. 4 is a flowchart illustrating a method for controlling four-wheel independent steering vehicles according to another embodiment of the present disclosure.

As illustrated in FIG. 4, when a parallel movement key 171 is input (S310), a processor 110 checks a vehicle speed and a brake status in response to the signal input from the parallel movement key 171.

When the signal from the parallel movement key 171 is input, the vehicle speed is 0, and a brake pedal is pressed, the processor 110 sets a parallel movement mode (Crab mode) (S340).

If any one of the three conditions is not satisfied, the processor 110 outputs a guidance message indicating that the parallel movement mode is unable to be set (S330) and maintains the current mode.

When the parallel movement mode is set, the processor 110 controls a position controller 150 and a motor controller 160 to primarily change the position of each wheel to the parallel movement mode.

The processor 110 stores the measured steering angle as a reference steering angle in a memory 120.

In addition, when the wheel does not reach a specified angle, the processor 110 sets steering limitations for manual steering via the steering wheel 11 (S350). Since the angle of the wheel has changed when the parallel movement mode is set, the processor 110 may set a limit angle (a angle) to prevent the steering angle from changing to a value exceeding a certain angle.

The processor 110 may set different limit angles depending on the set mode.

When the steering wheel 11 is steered, the processor 110 controls the position of the wheel (tire angle) to be secondarily adjusted through the position controller 150 and the motor controller 160 by the steering of the steering wheel 11 (S360).

The processor 110 controls the position controller 150 by setting a gain so that the force to return to the reference steering angle increases as the steering angle changed by the manual steering of the steering wheel 11 approaches the limit angle (a angle).

In addition, if the steering angle changed by the manual steering of the steering wheel 11 exceeds the limit angle (a angle) (S370), the processor 110 controls the motor angle of the steering motor to be unchanged (S380).

In addition, the processor 110 controls the position of the wheel to return to a position corresponding to the reference steering angle.

Accordingly, the processor 110 limits excessive steering by increasing the force with which the steering wheel 11 or the wheel tries to return to its original position as the steering angle of the steering wheel 11 approaches the limit angle, and adjusts the angle of the wheel again by returning the steering angle to the existing steering angle if steering exceeding the limit angle occurs.

The processor 110 repeats adjusting the angle of the wheel by the steering of the steering wheel 11 (S390).

When the wheel is located at a specified angle of 90 degrees, the processor 110 may output a notification about the state in which parallel movement is possible through an output unit 180.

Accordingly, the vehicle may move horizontally to the left or right. For example, the vehicle may perform parallel parking through the parallel movement mode.

Therefore, the system and method for controlling four-wheel independent steering vehicles according to the embodiment of the present disclosure can adjust the four wheels depending on the mode in the four-wheel independent steering vehicle, and can prevent the steering angle from changing significantly through steering limitations during auxiliary steering using the steering wheel. In addition, the present disclosure can quickly adjust each wheel to the target angle and move the vehicle at an accurate angle by finely adjusting the position of the wheel.

While the present disclosure has been described with respect to the embodiments illustrated in the drawings, it will be obvious to those skilled in the art that such embodiments are provided by way of example only. It will be understood by those skilled in the art that various modifications and other equivalent embodiments may be made without departing from the spirit and scope of the disclosure as defined in the following claims. Therefore, the technical protection scope of the present disclosure should be defined by the following claims.

What is claimed is:

1. A system for controlling four-wheel independent steering vehicles, comprising:
   a steering angle sensor configured to detect a steering angle based on movement of a steering wheel;
   a motor controller configured to change a position of a wheel in response to the steering angle;
   a parallel movement key configured to set a parallel movement mode; and
   a processor programmed to adjust the position of the wheel through the motor controller in the parallel movement mode in response to activation of the parallel movement key and to control the motor controller to adjust the position of the wheel in response to the steering angle, wherein, in the parallel movement mode, the steering angle of the steering wheel is restricted to a limited range.

2. The system according to claim 1, wherein:
   when the parallel movement key is activated, the processor is programmed to check a vehicle speed and whether a brake pedal is operated, and, when the parallel movement key is activated, the vehicle speed is 0, and the brake pedal is pressed, the processor sets the parallel movement mode.

3. The system according to claim 1, wherein the processor is programmed to control the wheel to move at a specified angle in the parallel movement mode, and then to set the steering angle detected by the steering angle sensor as a reference steering angle.

4. The system according to claim 3, wherein the processor is programmed to return the position of the wheel to a position corresponding to the reference steering angle when the steering angle caused by steering the steering wheel exceeds the limited range.

5. The system according to claim 1, further comprising a position controller configured to apply a control signal to the motor controller, wherein the processor is programmed to control a gain of the position controller so that a force to return to a previous position increases as the steering angle approaches an end of the limited range.

6. A method for controlling four-wheel independent steering vehicles, comprising:
   setting a parallel movement mode, using a processor, when a parallel movement key is activated;
   adjusting, by the processor, a position of a wheel to a position corresponding to the parallel movement mode using a motor controller;
   setting a limit angle for a steering angle of a steering wheel and controlling the steering angle to prevent it from exceeding the limit angle; and
   adjusting, using the motor controller, the position of the wheel in response to the steering angle.

7. The method according to claim 6, wherein setting the parallel movement mode comprises:
   checking a vehicle speed and checking whether a brake pedal is operated when the parallel movement key is activated; and
   setting the parallel movement mode when a signal from the parallel movement key is received, the vehicle speed is 0, and the brake pedal is pressed.

8. The method according to claim 6, wherein, when controlling the steering angle to prevent the steering angle from exceeding the limit angle, the processor controls a gain of a position controller configured to apply a control signal to the motor controller so that a force to return to a previous position increases as the steering angle approaches the limit angle.

9. The method according to claim 6, further comprising, after adjusting the position of a wheel, setting a steering angle detected by a steering angle sensor as a reference steering angle.

10. The method according to claim 9, wherein, when controlling the steering angle to prevent the steering angle from exceeding the limit angle, the processor returns the position of the wheel to a position corresponding to the reference steering angle when the steering angle exceeds the limit angle.

* * * * *